US010020996B1

(12) United States Patent
Protasov et al.

(10) Patent No.: US 10,020,996 B1
(45) Date of Patent: Jul. 10, 2018

(54) REAL-TIME POLICY MANAGEMENT OF DATA MANAGEMENT LIFE CYCLE

(71) Applicant: EMC Corporation, Hopkinton, MA (US)

(72) Inventors: Lena Protasov, Sunnyvale, CA (US); Sukarna Grandhi, Fremont, CA (US); Bela Patel, Fremont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 986 days.

(21) Appl. No.: 13/930,243

(22) Filed: Jun. 28, 2013

Related U.S. Application Data

(63) Continuation of application No. 13/929,088, filed on Jun. 27, 2013, now abandoned.

(51) Int. Cl.
*H04L 1/22* (2006.01)
*G06F 8/00* (2018.01)
*H04L 12/24* (2006.01)

(52) U.S. Cl.
CPC ............... *H04L 41/22* (2013.01); *G06F 8/00* (2013.01); *H04L 1/22* (2013.01)

(58) Field of Classification Search
CPC ... G06F 8/34; G06F 8/20; H04L 41/22; H04L 41/14
USPC .................................. 715/763, 762, 853, 735
See application file for complete search history.

(56) References Cited

U.S. PATENT DOCUMENTS

| | | | |
|---|---|---|---|
| 2003/0046004 A1* | 3/2003 | White | H04L 45/00 702/1 |
| 2013/0031492 A1* | 1/2013 | Curtis | G06F 8/34 715/762 |
| 2013/0346898 A1* | 12/2013 | Kokemohr | G06F 3/0482 715/769 |

* cited by examiner

*Primary Examiner* — Doon Chow
*Assistant Examiner* — Le Nguyen
(74) *Attorney, Agent, or Firm* — Polsinelli PC

(57) ABSTRACT

A methodology for creating a policy on graphic user interface ("GUI") to control system resources on a network is provided. The methodology includes: providing a palette section in the GUI for display of libraries of different policy nodes, the policy nodes including at least one source element, at least one target element, and at least one action element that represent actions to be performed to transfer data between policy nodes; providing a policy design section in the GUI for assembly a policy out of different policy nodes from the palette section; instructing, after completion of a design of a policy in the GUI, an implementation of the policy by the system resources; and displaying in near real time a status of the implementation of the policy; wherein the competed policy in the GUI that is subject to the instructing contains sufficient information for the system resources to implement the policy without additional programming.

21 Claims, 16 Drawing Sheets

| New | Configure | Show All | Start Policy | Commit Policy |

| Source | Target | Actions | Properties |

REAL-TIME POLICY MANAGEMENT OF DATA MANAGEMENT LIFE CYCLE

CROSS-REFERENCE TO RELATED APPLICATIONS

This application is a continuation application of U.S. application Ser. No. 13/929,088, filed Jun. 27, 2013, the entire disclosure of which are incorporated herein by reference in their entirety.

FIELD OF THE INVENTION

The present disclosure relates generally to data management life cycle. More specifically, the present invention relates to a graphic user interface for drafting, executing and real time monitoring of the execution of a policy in a data management life cycle.

BACKGROUND OF THE INVENTION

Computer network operations conventional have data management life cycle(s) with respect to certain operations. In backup operations, it may be desirable for certain components on the computer network to periodically backup to other components on the network. For example, a company may have a policy that a particular hard drive may need to backup daily to a particular tape directory. There may still be a further policy that the tape library may need to clone to permanent storage weekly.

Currently, these policies must be created by hand, and then programmed manually into the system to implement. Real time status of the implementation is also difficult to track.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

The present disclosure describes systems and methods for a real-time policy management of a data management life cycle. For example, one or more source elements can have resident data transferred to one or more target element via one or more actions. A graphical user interface can provide real-time status of the data management life cycle. Various examples of the disclosed systems and methods are discussed in detail below. While specific examples are discussed, it should be understood that this is done for illustrative purposes only. The examples are non-limiting and it will be understood that other components and configurations can be used without parting from the scope of the disclosure.

Disclosed herein is a real-time visual policy configuration for data management life cycle. The policy for data management life cycle can be graphically represented via a graphical user interface. The graphical user interface can provide the user with a visual representation of a data management life cycle. The graphical user interface can also provide the user privileges to create, edit, configure, commit and start a policy for data management life cycle. Further, the graphical user interface can provide real-time status of the policies, for example, completion, the percent completed, in progress, error, or specific error codes.

Figure 1:
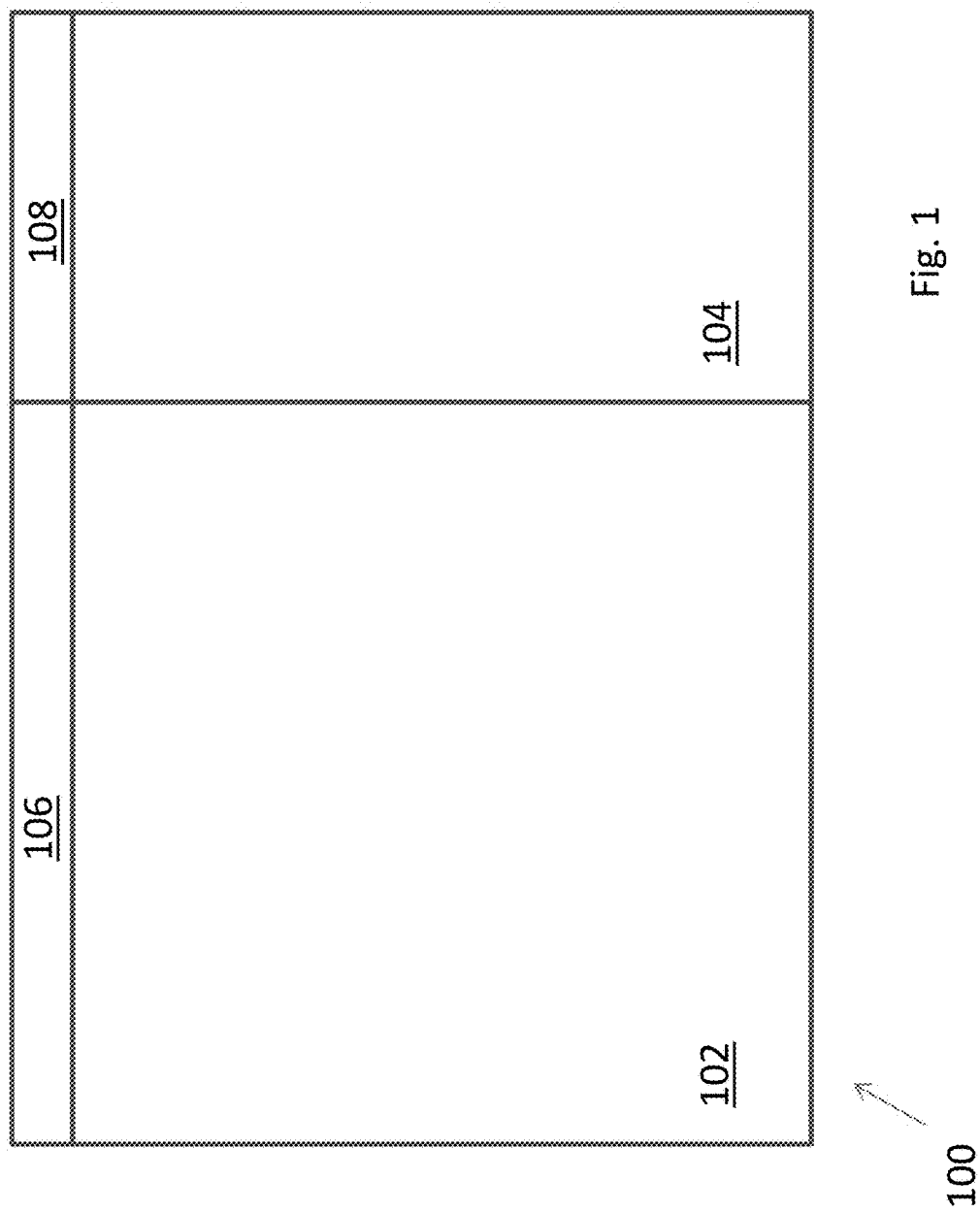
FIG. 1 is a step diagram of a graphical user interface of a real-time policy management of data management life cycle, in accordance with an example implementation of the present technology.

FIG. 1 is a step diagram representing an example embodiment 100 of a graphical user interface ("GUI") for designing and implementing a real-time policy management of data management life cycle. The graphical user interface can includes a policy display section 102 and a palette section 104. Policy display section 102 has an associated policy navigation bar 106, and pallet section 104 has an associated palette navigation bar 108. As discussed below, policy display section 102 is the portion of the GUI in which the drafted can graphically create, execute and monitor the status of policies.

Figure 2:
FIG. 2 is a step diagram of a menu bar for a policy drafting section of the graphical user interface of a real-time policy management of data management life cycle, in accordance with an example implementation of the present technology.

Referring now to FIG. 2, policy navigation bar 106 allows the user to control the nature of the policy displayed with the policy section 102. Possible control options include "New" for create a new policy, "Configure" to edit a policy, "Show all" to show all available policies, "Start policy" to start a policy and/or "Commit policy" to save a policy. Other control commands (not shown) as are typical of graphic user interfaces in drafting programs, such as delete, zoom, spellcheck, print, etc., may also be present. Selection of these control buttons may pull up a variety of drop down menus or other screens to access the underlying information. The invention is not limited to any particular commands or organization of commands.

Figure 3:
FIG. 3 is a step diagram of a menu bar of a palette section of a graphical user interface of a real-time policy management of data management life cycle, in accordance with an example implementation of the present technology.

Palette section 104 provides a library of components to populate the policy within policy section 102. Referring now to FIG. 3, palette navigation bar 108 allows the user to control the nature of what is displayed with the palette section 104. Possible control options include pulling up template libraries for source elements, target elements, actions, and properties, all discussed below.

Figure 4:
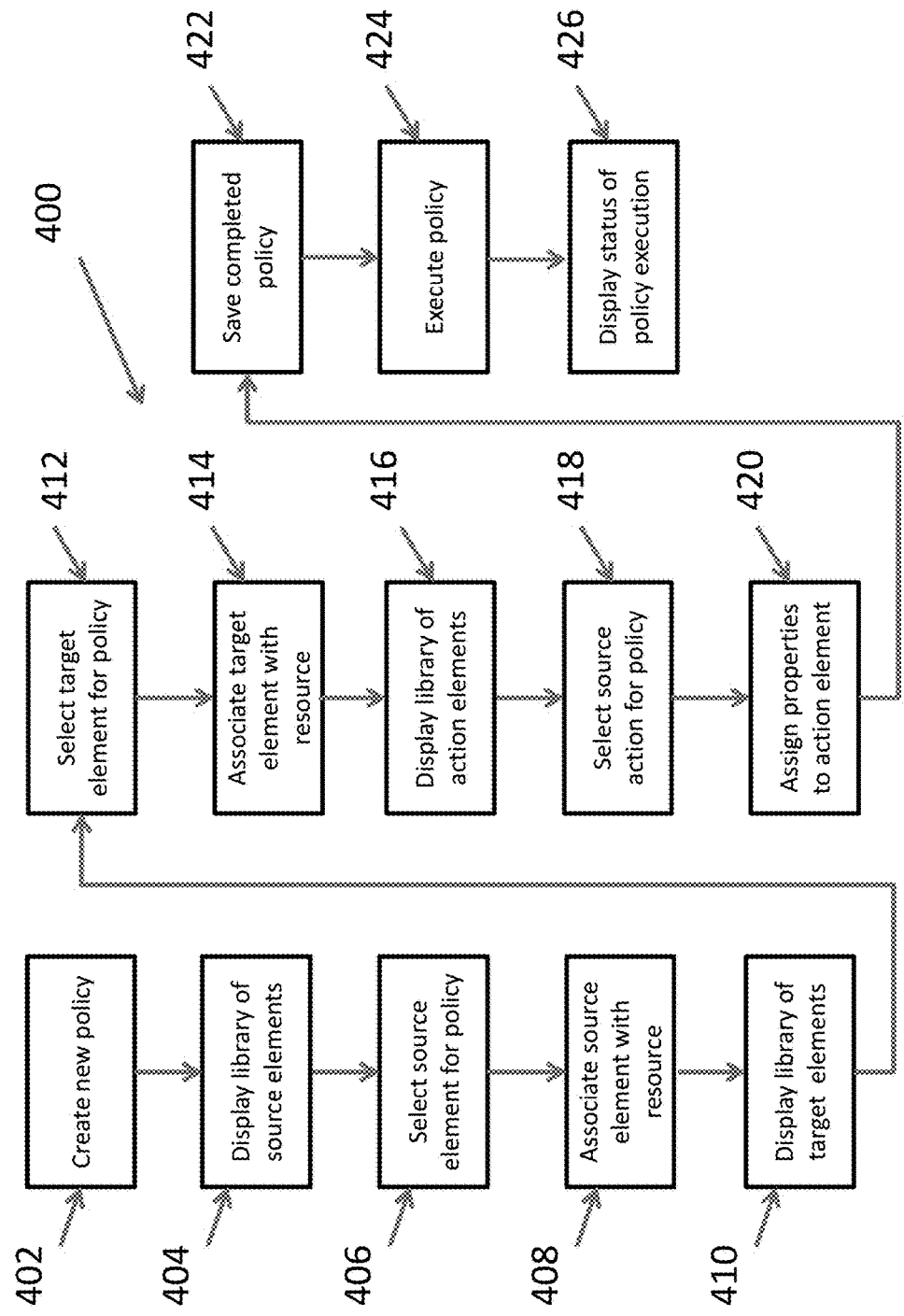
FIG. 4 is a flow chart of an example method of creating a policy of a real-time policy management of data management life cycle, in accordance with an example implementation of the present technology.

The various components above best described in an example of the creation of a policy according to the flowchart of FIG. 4, which is an example method of creating a policy of a real-time policy management of a data management life cycle. The method 400 illustrated in FIG. 4 is provided by way of example, as there are a variety of ways to carry out the method. Additionally, while the example method is illustrated with a particular order of steps, those of ordinary skill in the art will appreciate that FIG. 4 and the steps illustrated therein can be executed in any order that accomplishes the technical advantages of the present disclosure and can include fewer or more steps than illustrated. Each step shown in FIG. 4 represents one or more processes, methods, or subroutines, carried out in example method. The method illustrated in FIG. 4 will be described in relation to and making reference to FIG. 5 through FIG. 14.

At step 402, the graphical user interface receives a request to create a command to create a new policy. For example, a user input, such as a mouse click, will select "New" from the policy navigation bar 106. This clears the policy display section 102 for the design of a new policy. Control then moves to step 404.

As discussed in more detail below, the creation of any particular policy will involve at least three policy node components: a source element, a target element, and an action element. For example, presume a hypothetical policy is for a virtual machine to backup daily to a disk drive. In the hypothetical policy shown in various figures herein as an example, the source element is a virtual machine, the target element is a disk drive and the action element is backup.

Figure 5:
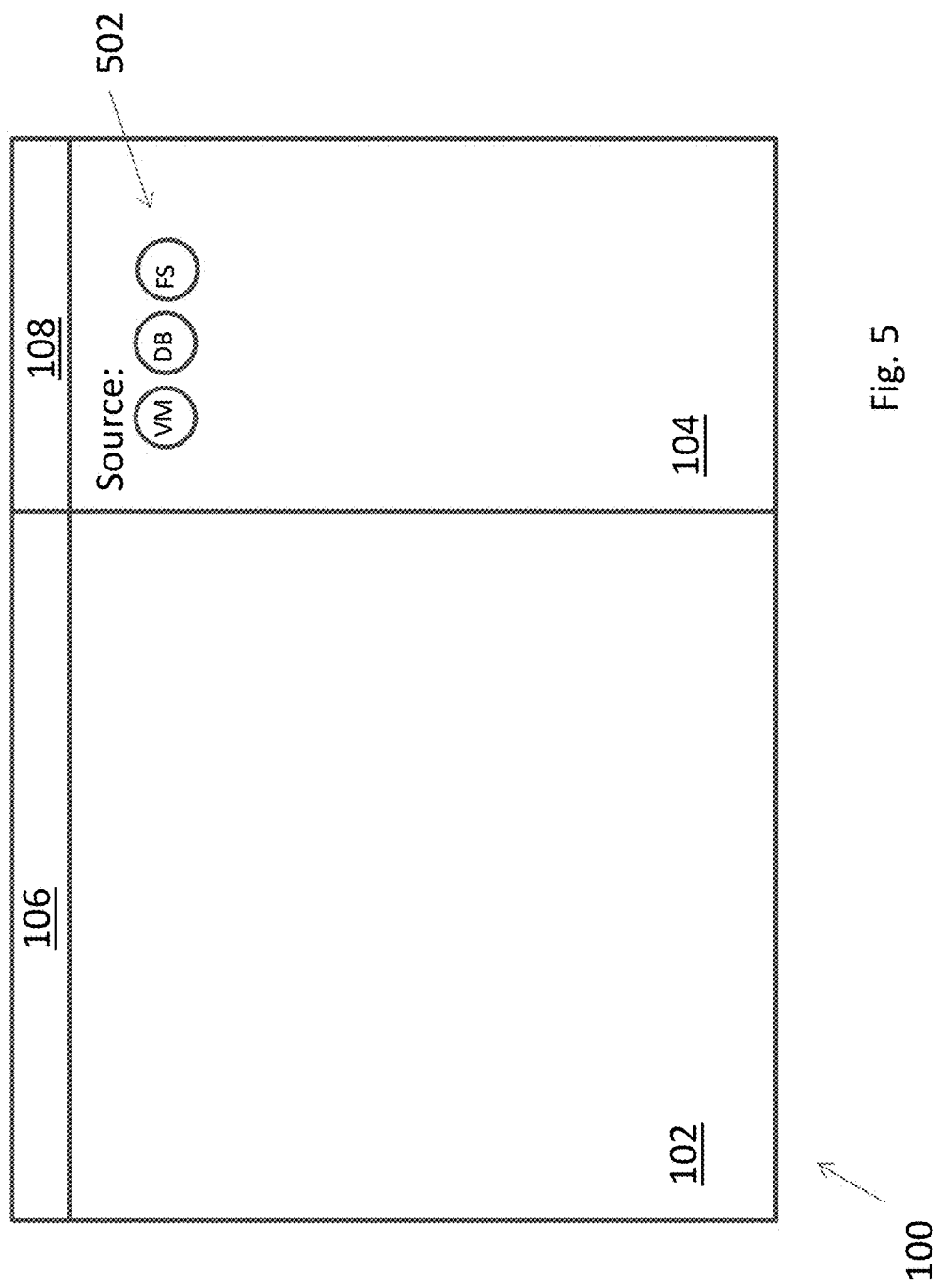
FIG. 5 is a step diagram of a source element palette of a graphical user interface of a real-time policy management of data management life cycle, in accordance with an example implementation of the present technology.

Referring now also to FIG. 5, at step 404 the user begins the new policy creation via palette navigation bar 108 to display a library of possible source elements 502. A "source element" can be any electronic medium of data to be transmitted to a second location. For example, a source element may be a client computer, a server computer, virtual machine, a database, file system, a previous backup, or any other type of electronic medium of data. The possible source elements 502 will appear in a portion of palette section 104 for drag and drop (or other known methods for moving and/or reproducing graphical components) into the policy drafting section 102. In FIG. 5, the virtual machine VM, file server FS and database DB are shown, but it is to be understood that any and all source elements 502 could be shown. Source elements could also be selectable from and shown in different subpages as appropriate.

The source elements 502 in FIG. 5 are blank templates. As discussed below, they may also be previously configured resources.

Figure 6:
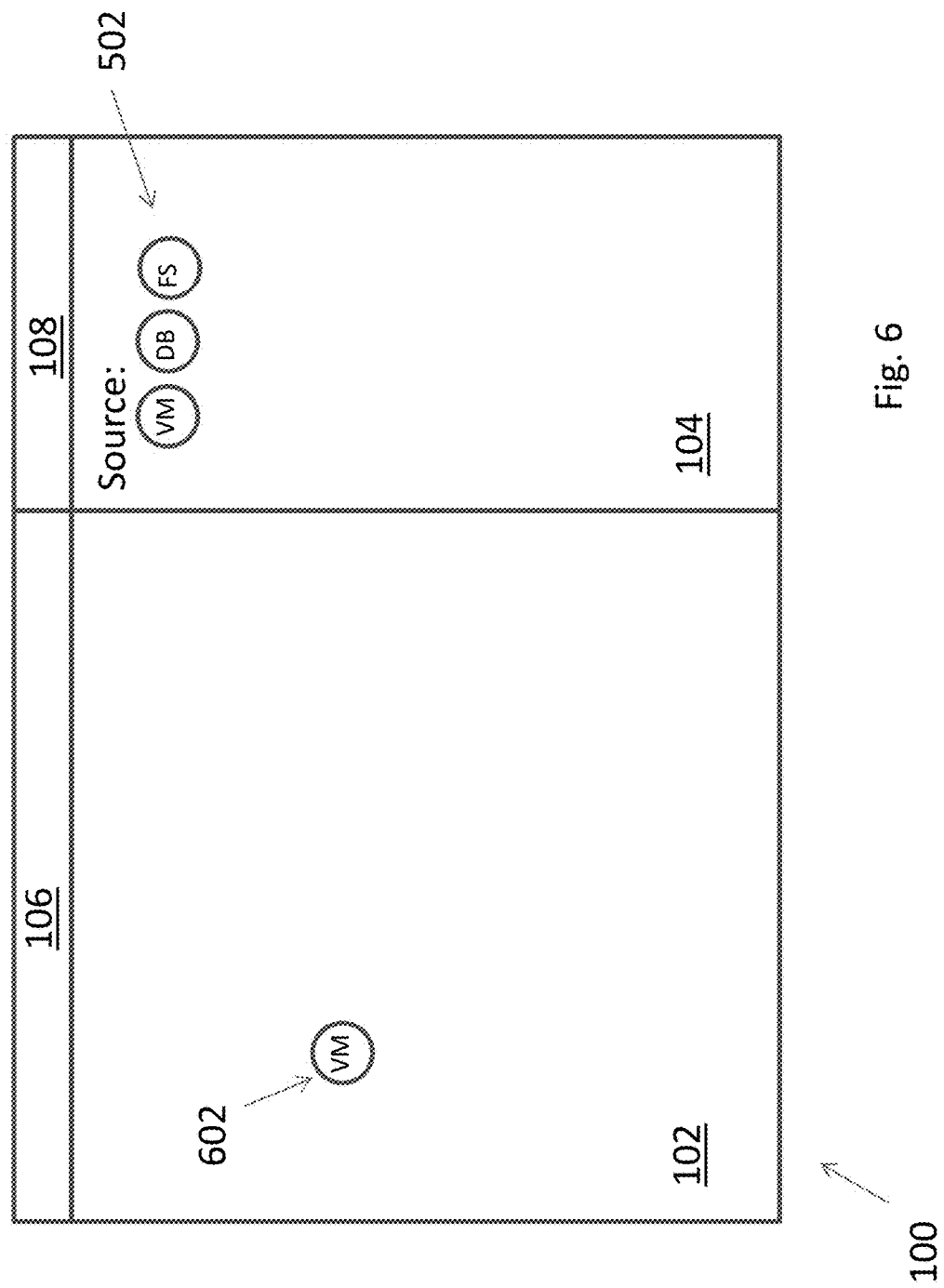
FIG. 6 is a step diagram of a source element being selected as a policy source element in a graphical user interface of a real-time policy management of data management life cycle, in accordance with an example implementation of the present technology.

Referring now also to FIG. 6, at step 406 the user will select a source element 502 from the palette section 104 and add it to the policy drafting section 102. For ease of distinction, this is referred to herein as policy source element 602. Preferably this occurs via drag and drop, but any other graphical method may be used. FIG. 6 shows the virtual machine VM as the policy source element 602 moved into the policy drafting section 102.

Figure 7:
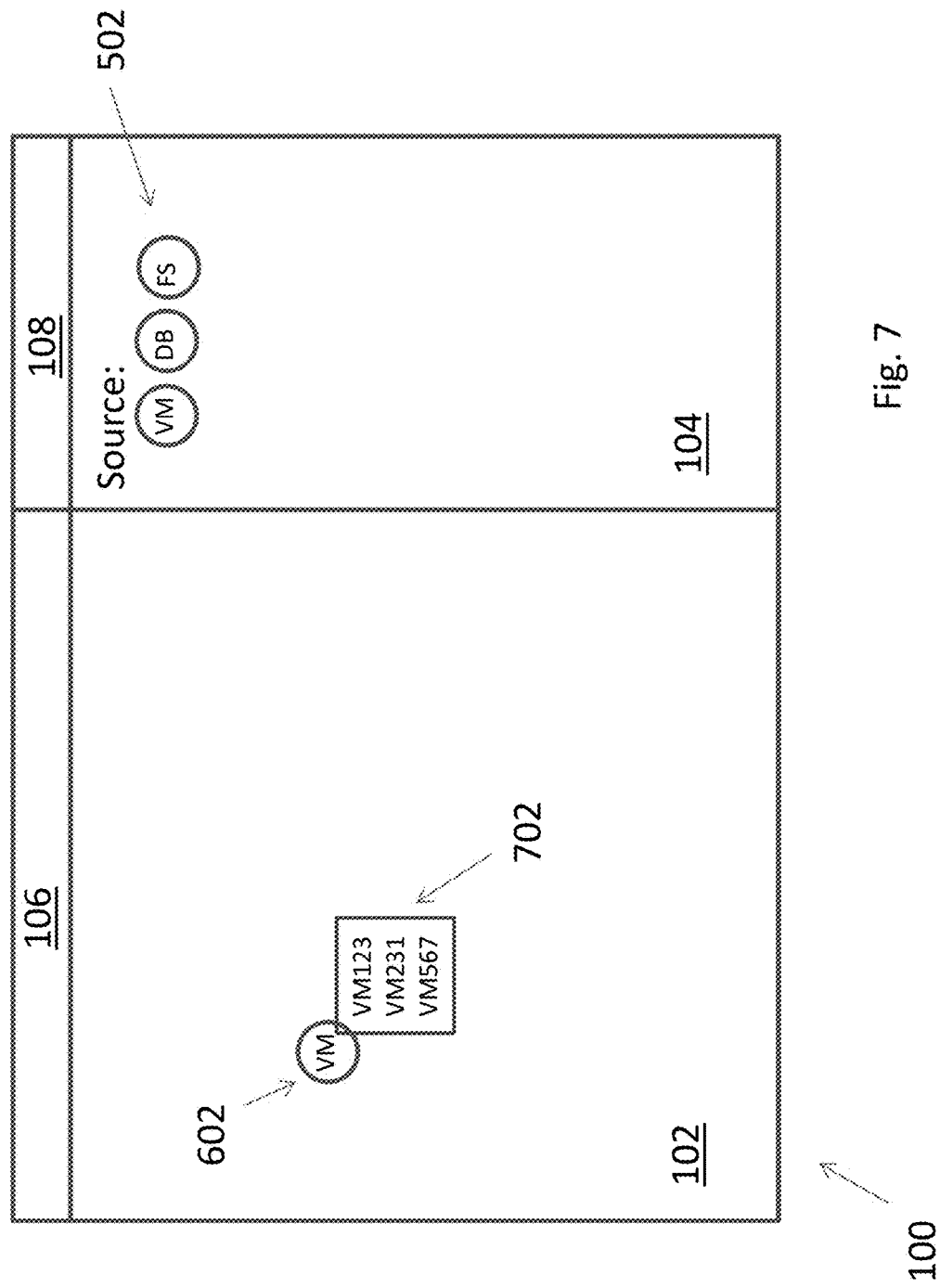
FIG. 7 is a step diagram of a policy source element being associated with a system resource within a graphical user interface of a real-time policy management of data management life cycle, in accordance with an example implementation of the present technology.

Referring now also to FIG. 7, at step 408 the user associates the policy source element 602 with an available system resource. For example, a user input, such as right-click on element 602 can display a pop-up menu 702 with available source elements in the actual system to manage. For the virtual machine VM, such a pop up menu 702 would include the available virtual machines to manage. The user selects the desired system resource, such as by left click, and this selection associates with the policy source element 602 to form an assigned source element 802, shown in FIG. 8.

Figure 8:
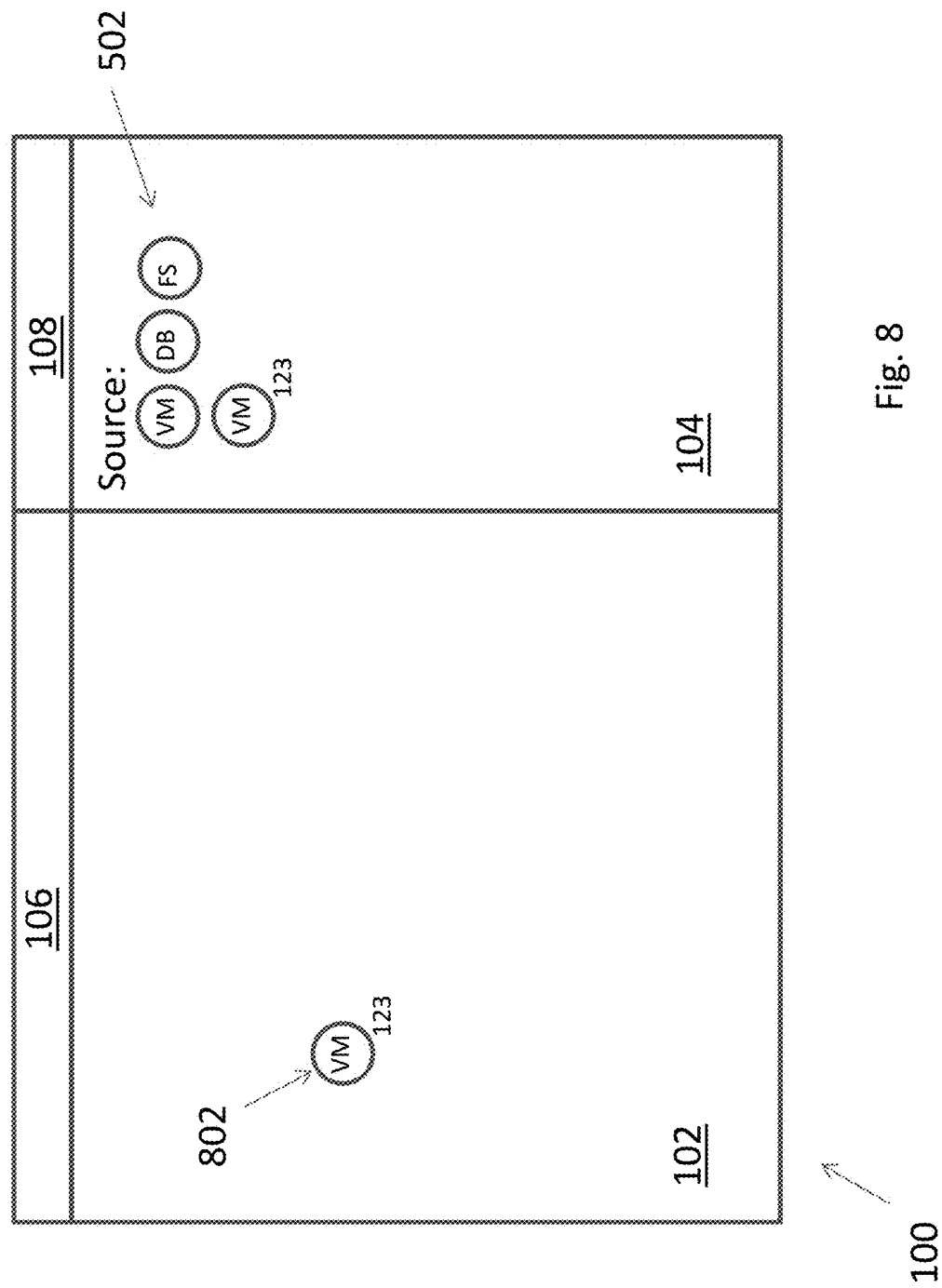
FIG. 8 is a step diagram of an assigned source element within a graphical user interface of a real-time policy management of data management life cycle, in accordance with an example implementation of the present technology.

Referring now also to FIG. 8, by way of example, virtual machine 123 is selected. This association can be shown on the assigned source element 802, although this need not be the case. The user can also save this policy node as a previously configured source element 502 for later use in this policy or by other policies; such a save may be via drag and drop of into the group of source elements 502 in palette section 104 as shown in FIG. 8, but any other save methodology may be used.

Figure 9:
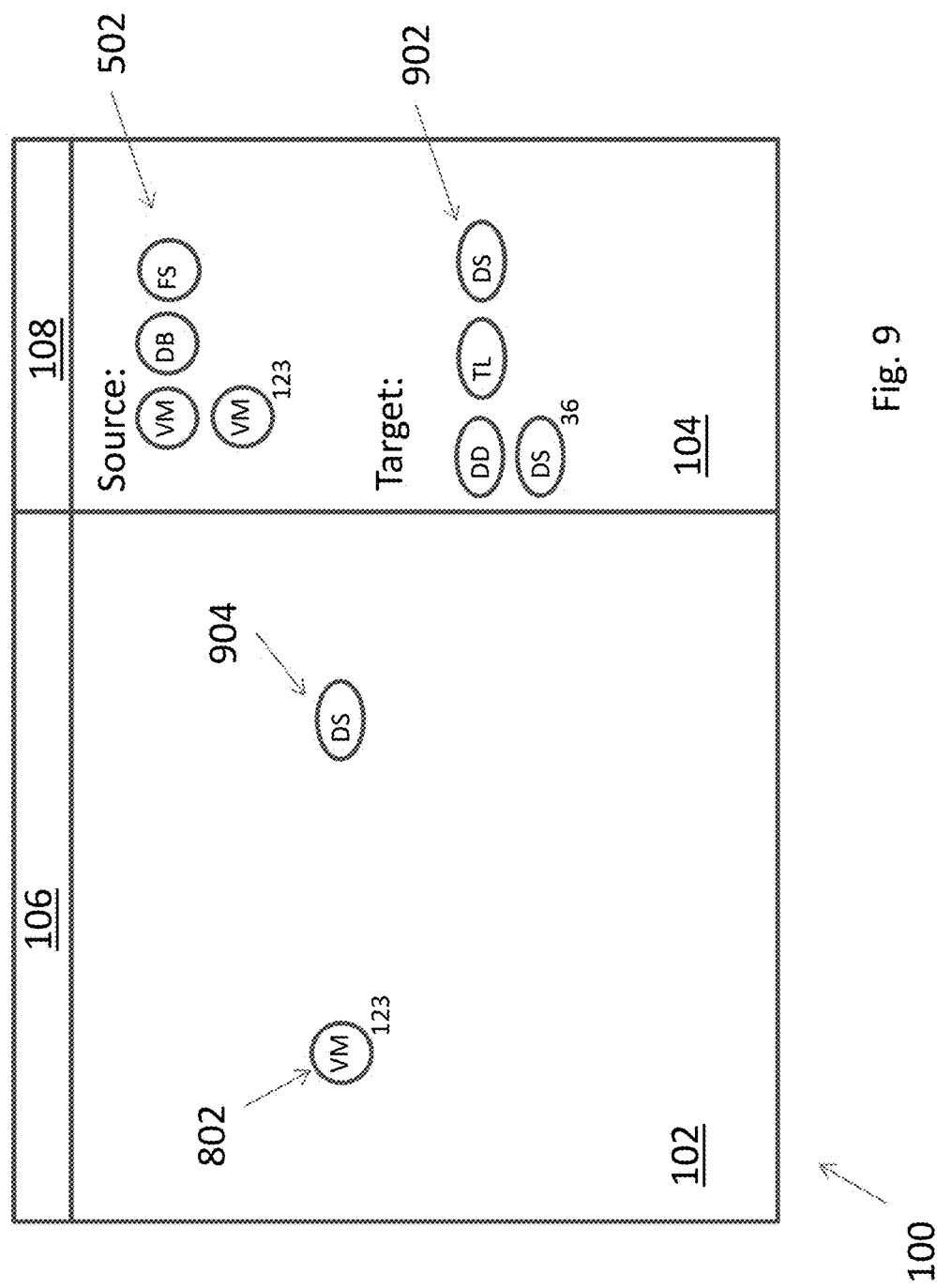
FIG. 9 is a step diagram of a target element palette of a graphical user interface of a real-time policy management of data management life cycle, in accordance with an example implementation of the present technology.

Referring now also to FIG. 9, the user can add a "target element" to the policy. A "target element" can be any physical electronic device used to receive and store data. For example, a disk drive, a tape library, a dedupe storage, a JBOD, a network attached storage device, an EMC² SYMMETRIX™, an EMC² DataDomain™, an EMC² CLARiiON™, or any other type of storage array. In FIG. 9, the disk drive DD, table library TL and dedupe storage DS are shown, but it is to be understood that any and all target elements 902 could be shown. Target elements could also be selectable from and shown in different subpages as appropriate.

The methodology for the adding target element 902 to a policy in the GUI tracks that of source element 502. At step 410, the user uses palette navigation bar 108 to display a variety of possible target elements 902; for reference purposes in FIG. 9 the list of source elements 502 may also still be shown, but this need not be the case. Target elements 902 are preferably of different shape and/or color from source elements 502, so that they may be easily discerned from each other. By way of non-limiting example, source elements 502 could be circular and target element 902 could be oval.

At step 412 the user will select a target element 902 from the palette section 104 and add it to the policy drafting section 102. For ease of distinction, this is referred to herein as policy target element. Preferably this occurs via drag and drop, but any other graphical method may be used. FIG. 9 shows the dedupe storage DS as the policy target element moved into the policy drafting section 102.

At step 414, the user associates the policy target element with an available system resource. For example, a user input, such as right-click on the target element 902 can display a pop-up menu with available target element in the actual system to manage. The user selects the desired system resource, such as by left click, and this associates with the policy target element to form an assigned target element 904. As with the assigned source element 602, assigned target source element 904 may be saved as a previously configured target element for later use.

The final component to add to a policy is the "action element". The action element can be any methodology for transferring data to a target element. For example, backup, clone, archive, stage, snap/replicate, or any other type of methodology for transferring data. A backup can be a copy of electronic data, for example, a specific file system, a folder, or disk drive. A clone can be an exact duplicate of the source data or backup copy. An archive can be long-term storage, for example, data transmitted to a target element for long-term storage and then deleted from the source element. A stage can be a clone of the source element with the deletion of the source element after completion of the data transfer. The deletion can be set via a threshold, for example, when the source element reaches 80% capacity or any predefined limit, the source element can be deleted after the data transfer is completed. A snap/replicate can be a point-in-time snapshot of data to be backed up.

Figure 10:
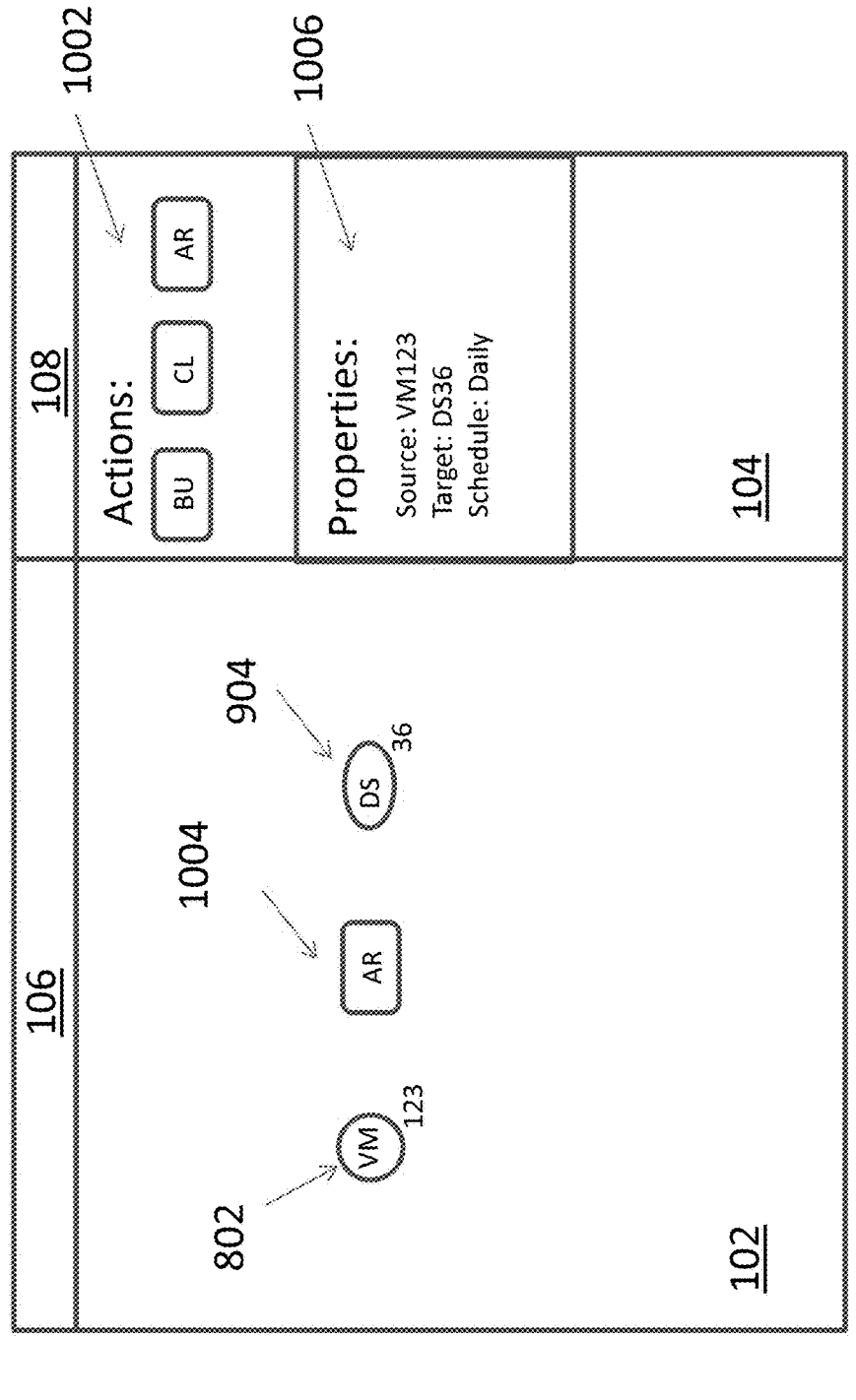
FIG. 10 is a step diagram of a policy action element and a properties menu within a graphical user interface of a real-time policy management of data management life cycle, in accordance with an example implementation of the present technology.

The methodology for adding an action element partially tracks that of the other elements herein. Referring now to FIG. 10, at step 416 the user via navigation bar 108 pulls up a library of possible action elements 1002. The actions of backup BU, clone CL and archive AR are shown, but it is to be understood that any and all action elements 1002 could be shown. Action elements could also be selectable from and shown in different subpages as appropriate. In addition, action elements 1002 are preferably of different shape and/or color from source elements 502 and target elements 902, so that they may be easily discerned from each other. In the example of FIG. 10, the action element has a shape of a square with rounded corners, which visual distinguishes from the circular source elements 502 and oval target elements 902.

At step 418, the user will select an action element 1002 from the palette section 104 and add it to the policy drafting section 102. For ease of distinction, this is referred to herein as policy action element. Preferably this occurs via drag and drop, but any other graphical method may be used. FIG. 10 shows the archive AR action as the policy action 1004 element moved into the policy drafting section 102.

At step 420, the action item is assessed properties that associated it with a policy source element 802 and a policy target element 904. This may be done in part by selecting the policy target element, which opens a properties menu 1006. Menu 1006 is shown in FIG. 10 as part of palette section 104, but it may appear in the GUI 100 wherever is convenient for the designer and/or user. Common properties are the assigned source element(s) 802 and the assigned target element 904 that the action element 1004 may work with, as well as a schedule. In the alternative to entry through the policy menu 1006, the user could use a line connector tool to link the elements.

Figure 11:
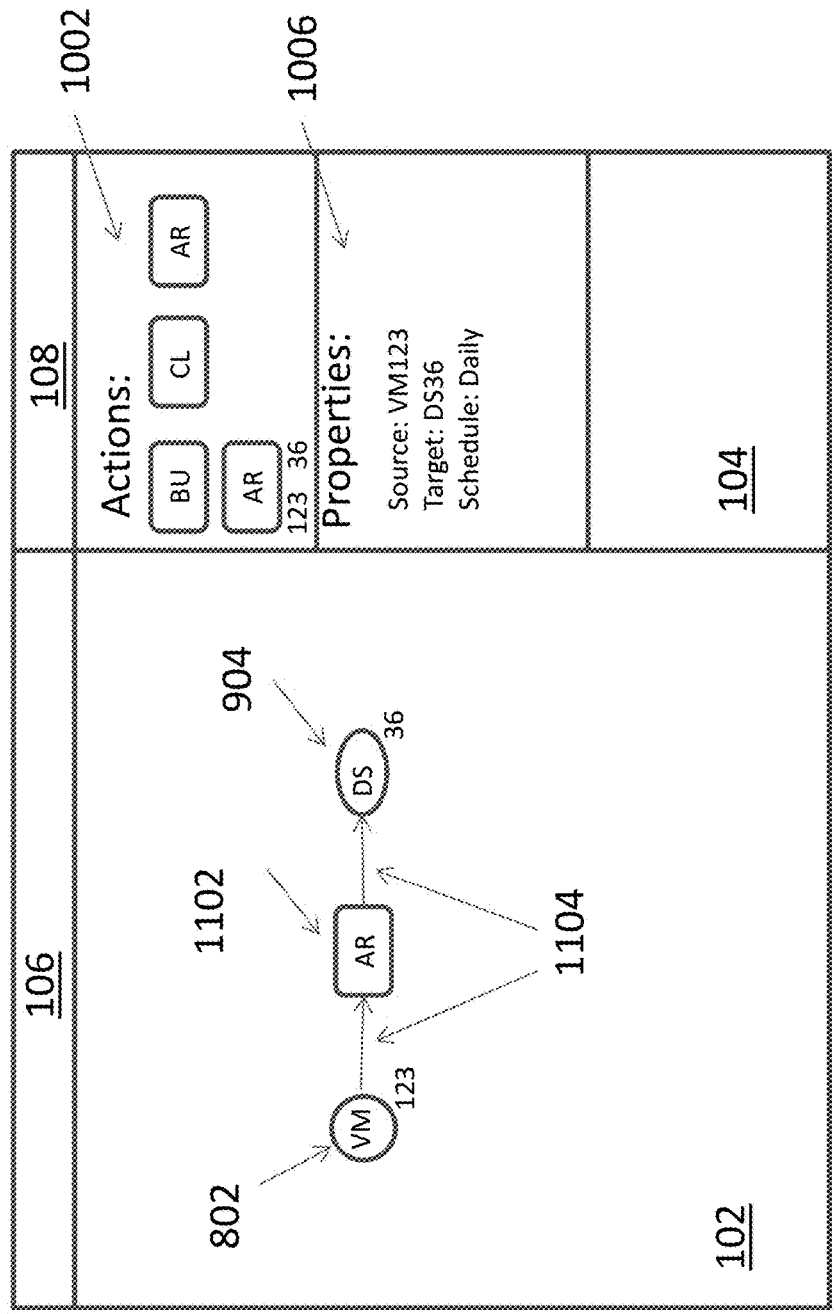
FIG. 11 is a step diagram of a completed policy within a graphical user interface of a real-time policy management of data management life cycle, in accordance with an example implementation of the present technology.

Referring now to FIG. 11, once the properties are entered, the policy action element 1004 becomes assigned action element 1102 with graphic links 1104 shown between the corresponding assigned source element 902 and assigned target element 904. The assigned action element 1102 can be saved with the library of action elements 1002 for later use.

The embodiments are not limited to any particular methodology for entering such assignments or properties, or the type of assignment of properties. The properties menu 1006 could be used for any of the elements described herein. Non-limiting examples are as follows. A source file system properties can include, name, host name, file system path, create disaster recover image (Boolean), use Network Data Management Protocol (NDMP), NDMP hostname, user-name, password. A source database properties can include, name, database type, host name, database server name, database name(s), database server port, database user id, and database password. A source previous backup properties can include, name, saveset id(s), saveset name(s) or pattern, date range, and host name(s). A source virtual machine properties can include, name, host name, container or virtual machine names, user id, password, and port. A target disk properties can include, name, host name, path, user id, password, encryption type, compression type, and maximum session. A target cloud storage properties can include, name, server name, user id, password, network write size, encryption type, compression type, bandwidth usage policies (maximum bandwidth, day, time range), inactivity timeout, and maximum sessions. A target dedupe storage properties can include, name, type, host name, path, user id, password, encryption type, maximum sessions, and protocol (TCP/IP of fibre channel). A target tape library properties can include, name, host name, device path, block size, idle timeout, encryption type, compression type, and maximum sessions.

At any time in the above process, the policy may be edited, saved, closed, later retrieved, etc., using the appropriate navigation commands in navigation bar 106.

Figure 12:
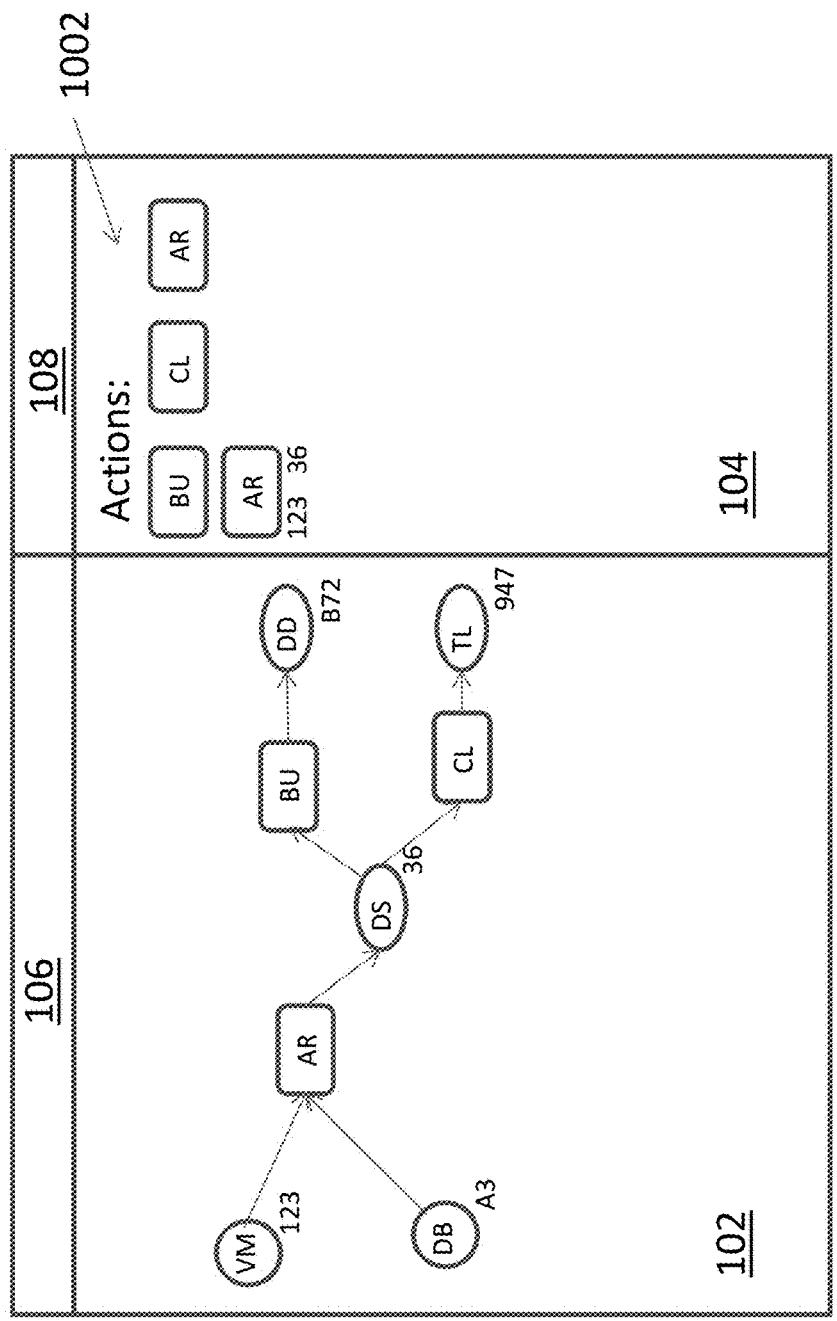
FIG. 12 is a step diagram of another policy with a graphical user interface of a complex real-time policy management of data management life cycle, in accordance with an example implementation of the present technology.

The above policy as shown in FIG. 11 represents the most basic design, in that it includes a single source element, action element and target element. However, the GUI can be used to design policies of any size with as many elements as desired using the above steps. FIG. 12 shows an example of a policy with several additional elements. Note that policies are not restricted to source-action-target elements, but may also be and/or include target-action-target (as shown in the FIG. 12), source-action-source, or target-action-source. There may also be branches and combinations as shown in FIG. 12.

The steps in the flowchart of FIG. 4 do not have to be followed in any particular order. For example, the user could start with a target element rather than a source element. In another example, the user could defer some or all of the assignments until a later point in the drafting. The entire process is flexible in its design implementation.

At some point the user will complete the design policy, and at step 422 saves it to the system memory for later use via the save option on navigation bar 106.

Figure 13:
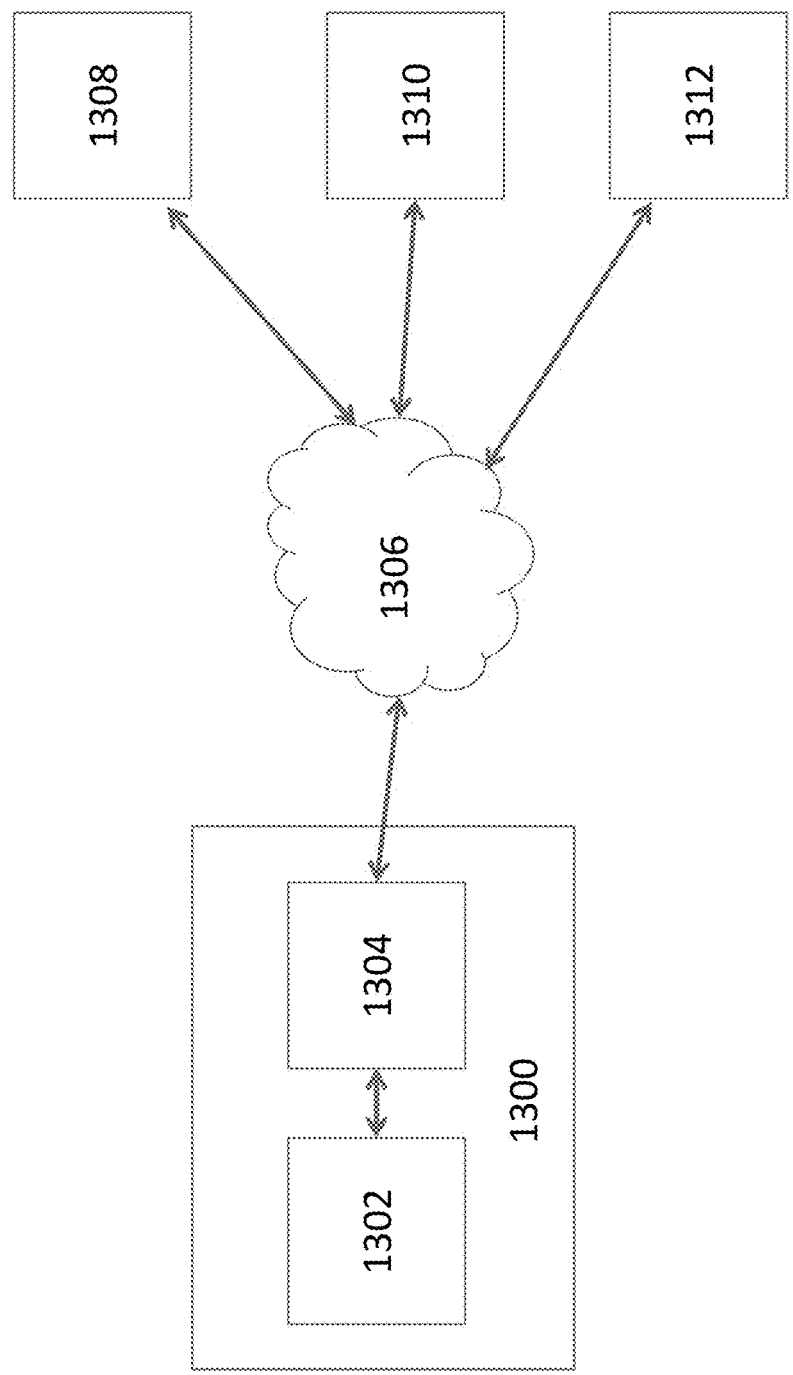
FIG. 13 is a block diagram of communication between a graphical user interface and one or more source and target elements of a real-time policy management of data management life cycle, in accordance with an example implementation of the present technology.

The graphic representation of the completed policy in the GUI is a visual flowchart of the created policy. In addition, but virtue of the assignments and properties discussed herein, the policy is also a series of instructions for the underlying system to implement. Thus, the user can execute the drafted policy at step 424 by selection of the start policy command in navigation toolbar 106. The policy will then be sent to the control for whatever system the policy applies to. Referring now to FIG. 13, the GUI 1302 can send instructions to the processor 1304 of a computer system 1300. Processor 1304 can then transmit the instructions to communication network 1306 to access one or more source and/or target elements 1308, 1310 and 1312. The source and/or target elements 1308, 1310, and 1312 can confirm receipt of the instruction and transmit back a response to processor 1304 via communication network 1306. Processor 1304 can then transmit the response to GUI 1302. GUI 1302 can then graphically represent the response to the user. The control will then execute the policy as designed. Preferably this does not require any further programming or code creation for the control to implement the policy.

Figure 14:
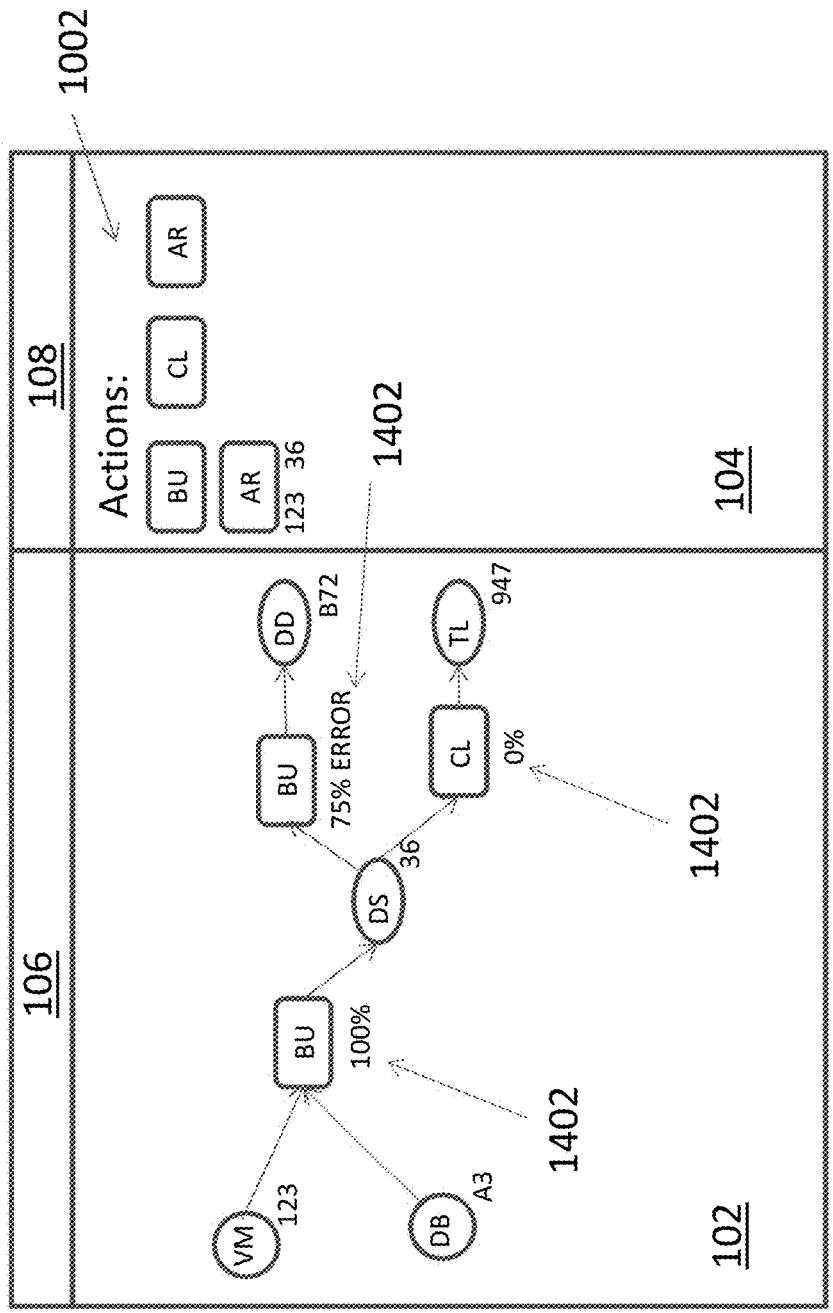
FIG. 14 is a step diagram of a real time feedback on the implementation of the policy of FIG. 13 within a graphical user interface of a real-time policy management of data management life cycle, in accordance with an example implementation of the present technology.

Referring now to FIG. 14, the GUI can at step 426 display execution of the data management life cycle policy in real time via status indicators 1402. In FIG. 14 status indicators shows that the backup of the virtual machine and the database is 100% (complete), the backup of the database is 75% complete (in progress), and the clone of the database is 0% (not yet commenced). Status indictors 1402 are shown as a percentage, but any form of indictor to show progress can be used. Status indicators 1402 can also indicate that an error has occurred in the action. Detailed information of the error can be viewed in the properties of the action.

The real-time status of the backup actions can be calculated by a heartbeat and message sent by the source elements and target elements configured via the graphical user interface. If a heartbeat is not received an error is displayed on the graphical user interface. The message can also contain completion status percentages. The completion percentages can also be displayed on the graphical user interface. Clicking on a particular element may bring up a new window with more detailed information about the policy node element and/or its status.

The real-time status of the backup actions can be saved in memory and later replayed at normal speed and/or different speeds. This may allow for review of the backup process for informational and/or diagnostic purposes.

Figure 15:
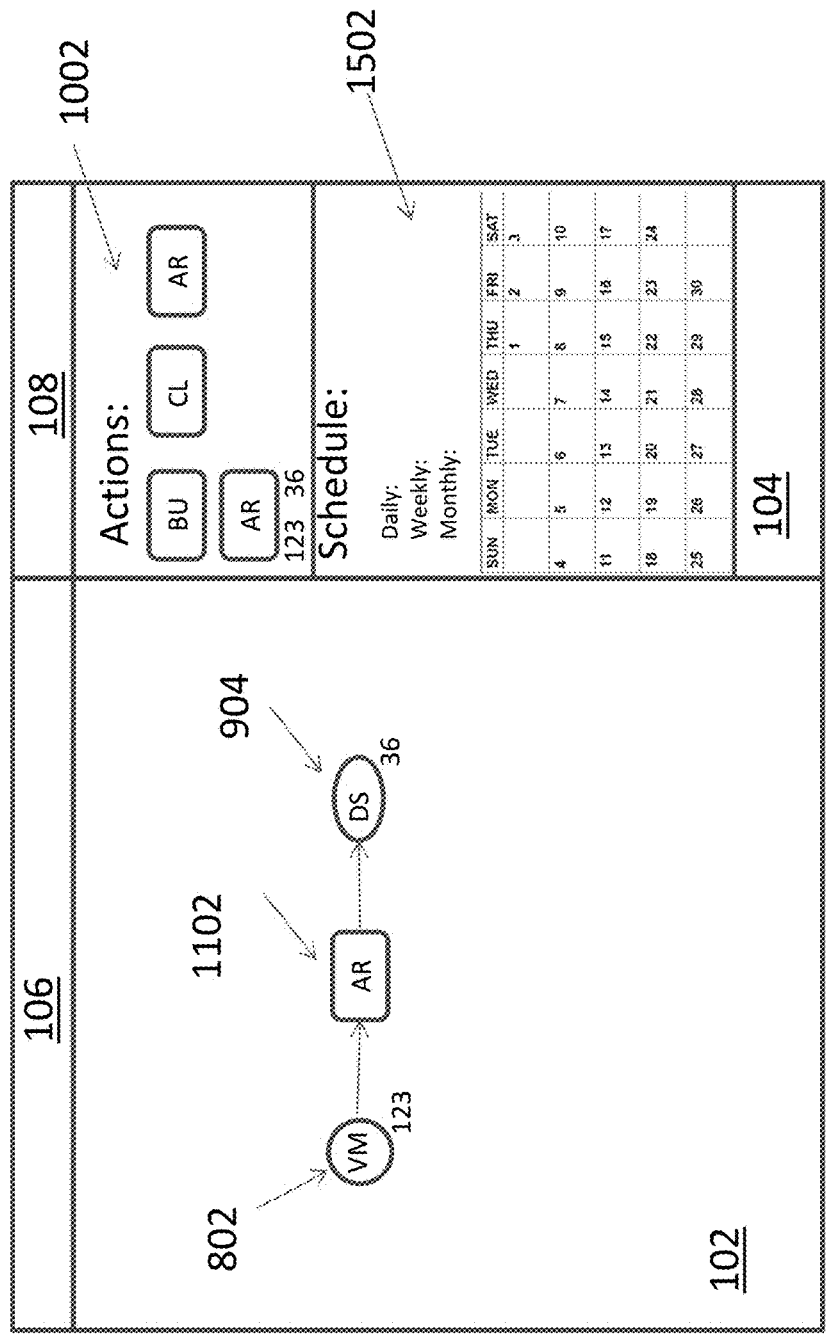
FIG. 15 is a step diagram of a graphical user interface of a real-time policy management of data management life cycle displaying a scheduling option, in accordance with an example implementation of the present technology.

Referring now to FIG. 15, a scheduling section 1502 can be shown. A user can create a new schedule or edit a current schedule for backup action 1102 or any other backup action. A schedule period can be selected, for example, weekly by day or monthly by day. A calendar can also be used to select the specific days for the selected backup action to run.

Figure 16:
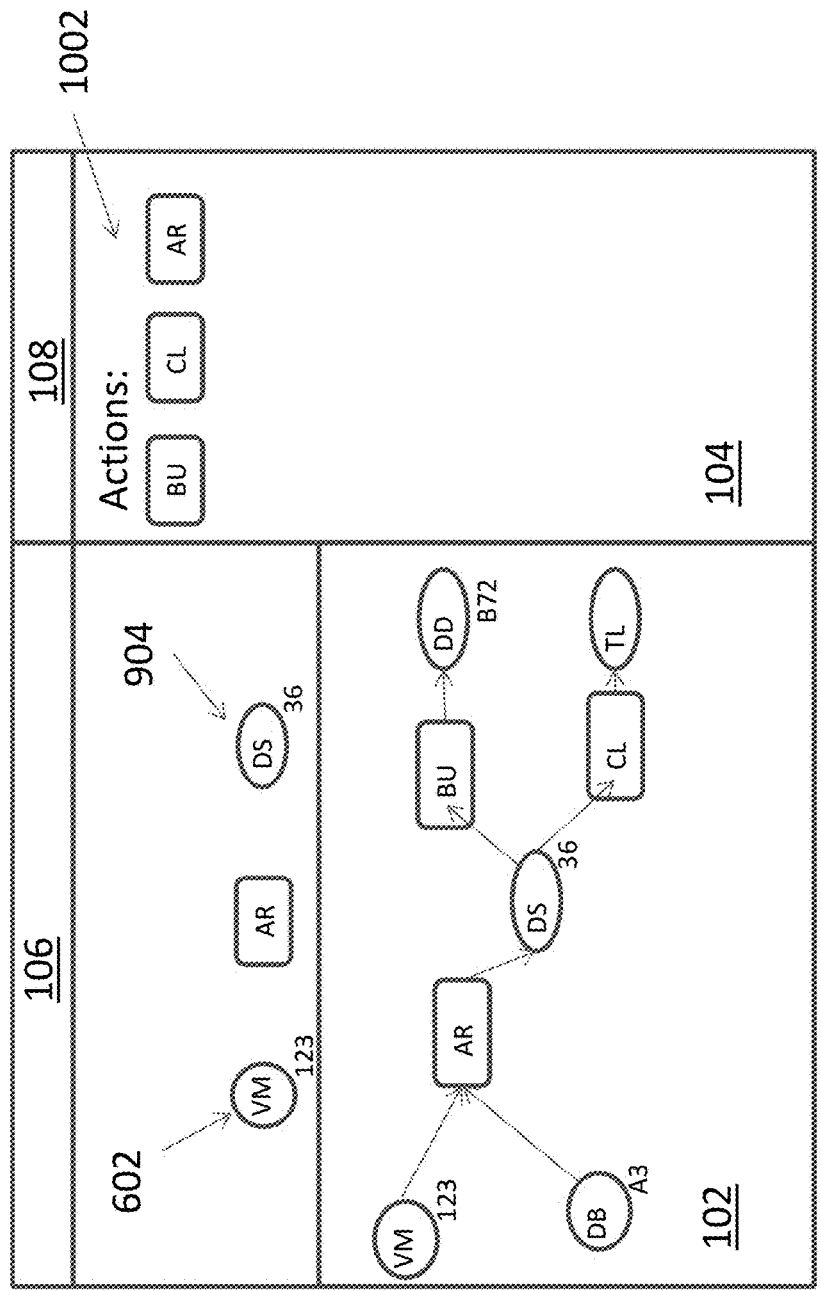
FIG. 16 is a step diagram of a graphical user interface of a real-time policy management of data management life cycle displaying a scheduling option with multiple windows, in accordance with an example implementation of the present technology.

Referring now to FIG. 16, policy drafting section 102 may be separated into multiple sections to show different policies, either in the drafting phase and/or real time status phase. Palette section 104 can also be separated into different sections to display the different libraries and properties.

Figure 17:
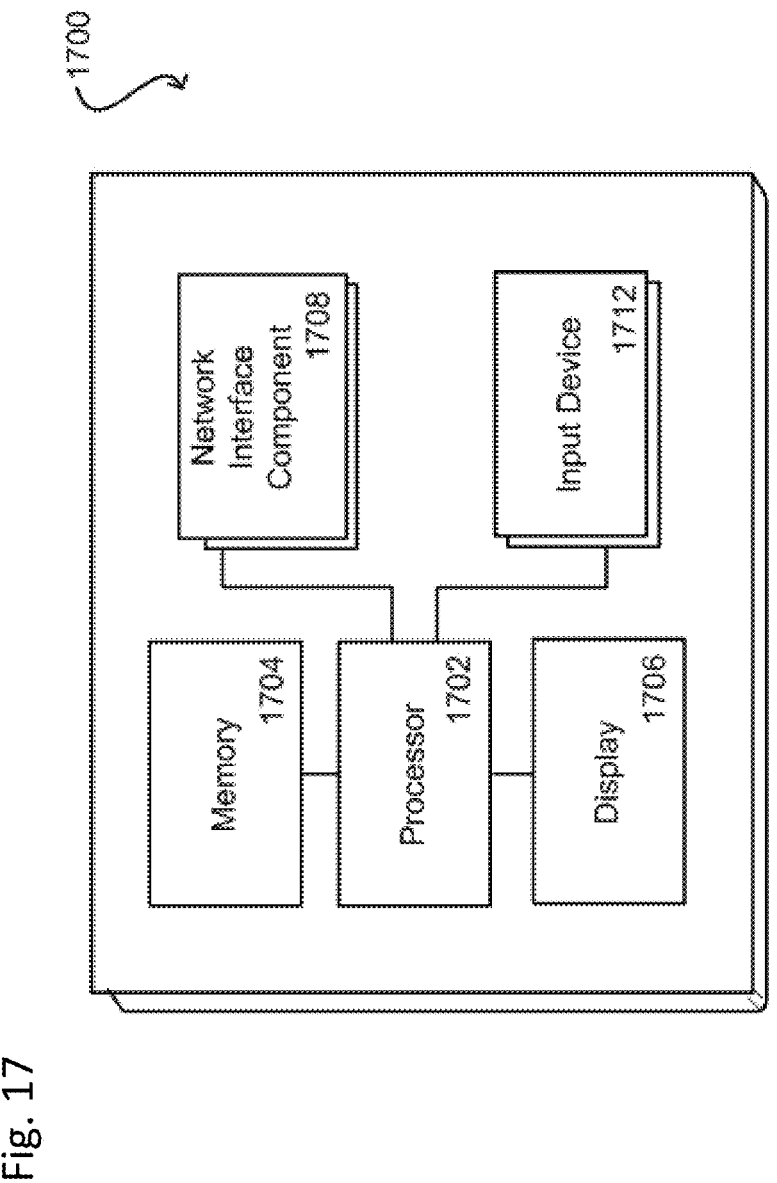
FIG. 17 illustrates a logical arrangement of a set of general components of an example computing device that can be utilized in accordance with various embodiments.

The various embodiments described throughout this disclosure can be utilized in a general purpose or specialized computing device. FIG. 17 illustrates a logical arrangement of a set of general components of an example computing device 1700. In this example, the device includes a processor 1702 for executing instructions that can be stored in a memory device or element 1704. As would be apparent to one of ordinary skill in the art, the device can include many types of memory, data storage, or non-transitory computer-readable storage media, such as a first data storage for program instructions for execution by the processor 1702, a separate storage for images or data, a removable memory for sharing information with other devices, etc. The device typically will include some type of display element 1706, such as a touch screen or liquid crystal display (LCD), although devices such as portable media players might convey information via other means, such as through audio speakers. As discussed, the device in many embodiments will include at least one input element 1708 able to receive conventional input from a user. This conventional input can include, for example, a push button, touch pad, touch screen, keyboard, mouse, keypad, or any other such device or element whereby a user can input a command to the device. In some embodiments, the computing device 1700 of FIG. 17 can include one or more network interface elements 1708 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method implemented on electronic computer hardware for creating a policy on graphic user interface ("GUI") to control system resources on a network, comprising:
    providing a palette section in the GUI for display of libraries of different policy nodes, the policy nodes including at least one source element, at least one target element, and at least one action element that represent storage actions to be performed to replicate data between policy nodes, the library for the policy node of the at least one action elements includes: (a) a first action element to duplicate target data from a source point to a target point without deleting the target data from the source point, and (b) a second action element to move target data from a source point to a target point and deleting the target data from the source point;
    providing a policy design section in the GUI for assembly a policy out of different policy nodes from the palette section;
    instructing, after completion of a design of a policy in the GUI, an implementation of the policy by the system resources, the policy including at least one of the first action element and the second action element; and
    displaying in real time a status of the implementation of the policy;
    wherein the competed policy in the GUI that is subject to the instructing contains sufficient information for the system resources to implement the policy without additional programming.

2. The method of claim 1, further comprising:
    associating at least one source element within the design policy section with a system resource on the network.

3. The method of claim 1, further comprising:
    saving, in the palette section for later use, the at least one source element that has been associated with a system resource on the network.

4. The method of claim 1, further comprising:
    associating at least one action item in the policy design section with at least one source element and at least one target element; and
    assigning at least one action items within the policy design section with at least one property, the property including a timing of implementation of the at least one action item.

5. The method of claim 4, further comprising after the associating or assigning:
    saving, in the palette section for later use, the at least one action item.

6. The method of claim 1, wherein the displaying further comprises:
    displaying the policy; and
    displaying status indicators relative to at least one action element in the policy to indicate the status of the action element.

7. The method of claim 6, wherein displaying the status indicators further comprises:

displaying a completion status of the at least one action element; and displaying, in response to an error in the execution of the action item, an error status indicator relative to the at least one action element.

8. An electronic device comprising a processor, electronically coupled to a display, having a GUI for designing a policy to control resources in a computer network, comprising:

a palette section in the GUI configured to display one or more policy nodes, the policy nodes including one or more source elements, one or more target elements, and/or one or more action elements, wherein the action elements represent storage actions to be performed to replicate data between policy nodes, the policy nodes of the at least one action elements includes: (a) a first action element to duplicate target data from a source point to a target point without deleting the target data from the source point, and (b) a second action element to move target data from a source point to a target point and deleting the target data from the source point;

the GUI configured to provide a design area to accept an arrangement of individual policy nodes from the palette to define a policy, the policy include at least one source element, at least one target element, and at least one action element;

the GUI configured to instruct engagement of the policy, the policy including at least one of the first action element and the second action element;

the GUI configured to display a real-time status, via the processor, of the engagement of the individual elements and the arrangement of elements;

wherein the competed policy in the GUI that is subject to the engagement contains sufficient information for the system resources to implement the policy without additional programming.

9. The method of claim 8, further comprising:
associating at least one source element within the design policy section with a system resource on the network.

10. The method of claim 8, further comprising:
saving, in the palette section for later use, the at least one source element that has been associated with a system resource on the network.

11. The method of claim 8, further comprising:
associating at least one action item in the policy design section with at least one source element and at least one target element; and
assigning at least one action items within the policy design section with at least one property, the property including a timing of implementation of the at least one action item.

12. The method of claim 11, further comprising after the associating or assigning:
saving, in the palette section for later use, the at least one action item.

13. The method of claim 8, wherein the displaying further comprises:
displaying the policy; and
displaying status indicators relative to at least one action element in the policy to indicate the status of the action element.

14. The method of claim 6, wherein displaying the status indicators further comprises:
displaying a completion status of the at least one action element; and displaying, in response to an error in the execution of the action item, an error status indicator relative to the at least one action element.

15. A non-transitory computer readable storage medium storing one or more sequences of instructions executed by one or more processors to cause the one or more processors to:

provide a palette section in the GUI for display of libraries of different policy nodes, the policy nodes including at least one source element, at least one target element, and at least one action element that represent storage actions to be performed to replicate data between policy nodes, the library for the policy node of the at least one action elements includes: (a) a first action element to duplicate target data from a source point to a target point without deleting the target data from the source point, and (b) a second action element to move target data from a source point to a target point and deleting the target data from the source point;

provide a policy design section in the GUI for assembly a policy out of different policy nodes from the palette section;

instruct, after completion of a design of a policy in the GUI, an implementation of the policy by the system resources, the policy including at least one of the first action element and the second action element; and display in real time a status of the implementation of the policy;

wherein the competed policy in the GUI that is subject to the instruct contains sufficient information for the system resources to implement the policy without additional programming.

16. The non-transitory computer readable storage medium of claim 15, further comprising:
associating at least one source element within the design policy section with a system resource on the network.

17. The non-transitory computer readable storage medium of claim 15, further comprising:
saving, in the palette section for later use, the at least one source element that has been associated with a system resource on the network.

18. The non-transitory computer readable storage medium of claim 15, further comprising:
associating at least one action item in the policy design section with at least one source element and at least one target element; and
assigning at least one action items within the policy design section with at least one property, the property including a timing of implementation of the at least one action item.

19. The non-transitory computer readable storage medium of claim 18, further comprising after the associating or assigning:
saving, in the palette section for later use, the at least one action item.

20. The non-transitory computer readable storage medium of claim 15, wherein the displaying further comprises:
displaying the policy; and
displaying status indicators relative to at least one action element in the policy to indicate the status of the action element.

21. The method of claim 20, wherein displaying the status indicators further comprises:
displaying a completion status of the at least one action element; and displaying, in response to an error in the execution of the action item, an error status indicator relative to the at least one action element.

\* \* \* \* \*